United States Patent [19]

Kissel

[11] Patent Number: 5,173,531
[45] Date of Patent: * Dec. 22, 1992

[54] ANTISTATIC TEXTILE-COMPOSITIONS AND SOL/GEL/POLYMER COMPOSITIONS

[75] Inventor: Charles L. Kissel, Anaheim, Calif.

[73] Assignee: Union Oil Company of California, Los Angeles, Calif.

[*] Notice: The portion of the term of this patent subsequent to Apr. 2, 2008 has been disclaimed.

[21] Appl. No.: 661,510

[22] Filed: Feb. 26, 1991

Related U.S. Application Data

[60] Division of Ser. No. 345,029, Apr. 28, 1989, Pat. No. 5,004,563, which is a continuation-in-part of Ser. No. 305,451, Feb. 1, 1989, Pat. No. 5,004,562.

[51] Int. Cl.$^5$ .......................... C08K 3/26; C08K 3/28; C08K 3/38

[52] U.S. Cl. .................................. 524/403; 524/404; 524/413; 524/425; 524/437; 524/442

[58] Field of Search ............... 524/403, 457, 404, 413, 524/425, 437, 442

[56] References Cited

U.S. PATENT DOCUMENTS 3,582,445  6/1971  Okuhashi .............................. 57/901

Primary Examiner—Joseph L. Schofer
Assistant Examiner—Jeffrey T. Smith
Attorney, Agent, or Firm—Gregory F. Wirzbicki; Alan H. Thompson

[57] ABSTRACT

A textile composition contains a textile material with a salt suffused therein. The composition is prepared by treating a textile material with a sol or gel composition containing a salt. The sol or gel composition is usually admixed with a polymer and the treated textile material (often carpeting) has an antistatic property.

19 Claims, No Drawings

ANTISTATIC TEXTILE COMPOSITIONS AND SOL/GEL/POLYMER COMPOSITIONS

RELATED APPLICATION

This is a division of application Ser. No. 345,029, filed Apr. 28, 1989 now U.S. Pat. No. 5,004,563 which is a continuation-in-part application of U.S. patent application Ser. No. 305,451 filed Feb. 1, 1989, now U.S. Pat. No. 5,004,562.

BACKGROUND OF THE INVENTION

Field of the Invention

This invention relates to the field of textile materials, to antistatic materials, to a composition useful for providing antistatic properties to textiles, and to methods for manufacturing and using such materials.

Introduction

The field of textile materials involves all manufactured forms of fiber assemblies including wovens, nonwovens, knitted articles, threads, yarns, ropes, etc. which are employed, in one form or another, in almost every aspect of commercial and household use, either alone or as components of composite articles. For sometime, the accumulation of static electricity as a result of the utilization of fabric assemblies is a phenomenon which has commanded the attention of the textile industry, particularly the carpet industry. Static is a cause of annoyance (e.g., items of apparel cling to the body and are attracted to other garments; fine particles of lint and dust are attracted to upholstery fabrics, increasing the frequency of requiring cleaning; one experiences a jolt or shock upon touching a metal doorknob after walking across a carpet). Also static is the cause of danger (e.g., a discharge of static electricity can result in sparks capable of igniting flammable mixtures such as ether/air, which are commonly found in hospitals, especially in operating rooms). Static discharge can also harm sensitive electrical equipment such as computers and scientific equipment. Representative places where carpets are used having these requirements are in hospitals, computer rooms, ballrooms, restaurants and theaters. All of these effects of static are accentuated in atmospheres of low relative humidity.

Of the many proposals for preventing the undesirable buildup of static electricity, the most satisfactory, with respect to their efficiency and permanence, appear to be those which involve fibers possessing electrical conductivity (e.g., metal fibers, fibers coated with electrically conductive material, or metallic laminate filaments) in combination with common, natural and synthetic fibers to produce a woven, nonwoven, knitted, netted, tufted or otherwise fabricated structure, which readily dissipates the static charges as they are generated.

Several fiber structures have been employed to alleviate the static problem. The manufacture of metallic or carbonized fibers of fine denier, especially in the form of monofilaments, is a difficult and costly operation; and since such fibers are quite dissimilar in character from ordinary textile fibers, problems arise in connection with blending and processing as well in the handling of the products obtained. Another structure, a metallic laminate filament, does not present blending and processing problems because of the close similarity to ordinary textile fibers, and the handling of the products obtained is consequently not objectionable. However, the cost of such filaments is high when compared with the natural or synthetic fibers with which they are blended. A third group of structures, textile fiber substrates whose surfaces have been coated with finely divided particles of electrically conductive material by vapor deposition, electrodeposition, or by the application of adhesive compositions, are in some cases less costly than metal or carbonized fibers and/or metallic laminate filaments, depending upon the nature of the electrically conductive material employed. However, these are difficult to fabricate because large chambers are required to enclose the material to be subjected to electro- or vapordeposition. Such coatings are often found lacking in cohesion and adhesion and are frequently too thick to be practicable in some applications — especially when the nature of the electrically conductive particulate matter is such that a high concentration thereof is required for satisfactory conductivity. Economy is achieved, therefore, only through sacrifices in durability or conductivity of the fiber.

Also, extrusion of blends of powdered synthetic polymers and finely divided electrically conductive material (e.g., carbon black, and metallic powders or flakes) into either fibers or fibrous coated substrates having the same or a different polymeric composition, is well known. Unfortunately, blends requiring a high concentration of the electrically conductive material are often not readily extruded, if at all, in any fibers. Also, coated fibrous substrates, are lacking in cohesion and adhesion. Methods for preparing blends of extrudates involve either (a) total incorporation of particles in the fiber or substrate (as to be obtained by the spinning of a solution or a melt containing them), or (b) surface incorporation of particles, achieved by the use of (1) an adhesive — e.g., to produce a true coating — or (2) impregnation of the particles into a fiber surface which has been softened or made tacky by means of a liquid softening agent and/or heat. The total incorporation of particles in the fiber or substrate and the use of an adhesive to bind the particles in the fiber or substrate as a true coating are inadequate and undesirable, because of (1) loss of properties such as conductivity as a result of disruption of the structural integrity of the fiber and (2) a low degree of durability.

Some materials can be dissolved into an adhesive mixture to provide antistatic performance. These material include quaternary ammonium salts and some inorganic salts. However, only a few materials are available because they are usually not compatible with polymeric, (e.g. latex) adhesives, and those that are difficult to incorporate into a wide variety of formulations.

In the preparation of compositions containing polymers, particularly latex, extremely small quantities of catalysts, activators, etc. are added during synthesis. Usually a resulting latex such as styrene butadiene rubber (SBR) contains up to about 1 weight percent of such materials, and acrylic or vinyl acrylic latexes contain about 0.1 weight percent. Also, anionic surfactants of up to 1 weight percent are used to stabilize latex emulsions. These materials are not antistatic. In order to produce acceptable electrical conductivity in a latex, salt materials must be compatibly combined with the latex in a sufficient concentration to provide adequate antistatic properties to textile materials to which the latex is applied. However, heretofore salts other than those used as described above which are added to a latex in concentrations sufficient to give antistatic performance tend to cause coagulation of the latex. The search continues for polymer compositions containing sufficient, compatible, flexible and inexpensive salt materials to be effective for providing antistatic properties when applied to textile materials.

SUMMARY OF THE INVENTION

The invention relates to a textile composition having antistatic properties. The textile composition contains a textile treated with a sol or gel composition containing a salt so that the salt is dispersed on the surface of or among the fibers comprising the textile. The sol or gel composition may be admixed with a polymer, such as a latex polymer, to produce a product admixture composition which can be employed to treat a textile. Ordinarily, the product admixture composition is combined with a filler material to produce a compounded polymer/salt product composition which may then be utilized to treat a starting textile material such as carpet to produce a textile composition of the invention. The textile product composition of the invention usually has an electrical conductivity in the range effective for controlling static electricity, i.e., from about $10^{-8}$ to about 10 Seimens/cm.

DETAILED DESCRIPTION OF THE INVENTION

The present invention involves a textile composition containing a starting textile material suffused with a salt. The textile material is usually suffused with the salt by contacting the textile material with a sol or gel composition containing the salt, or with a product admixture composition comprising (1) a sol or gel containing the salt admixed with (2) a polymer. In the preparation of a carpet, the sol or gel composition, or the product admixture, usually further contains a filler material, such as calcium carbonate, and optionally, further contains a frothing agent and/or a plasticizer. Any salt (normally introduced into the textile fibers by means of a sol or gel) in an amount which provides an effective antistatic property to a textile composition suffused with the salt may be utilized in the invention. Preferably, a latex polymer is admixed with the salt-containing sol or gel prior to contacting a textile material.

U.S. patent application Ser. No. 305,451, filed Feb. 1, 1989, now U.S. Pat. No. 5,004,562 by the present inventor and incorporated herein by reference in its entirety, describes salt-containing sol or gel compositions and their method of preparation, and the admixing of the sol or gels with polymers to produce product admixture compositions which are stable and noncoagulated. In addition to a salt, the sol or gel compositions usually contain a nonaqueous solvent, a stabilizer and, optionally, an acidic component. The solvent is typically an ether, ester, alcohol or combinations thereof the stabilizer is either a chelator, such as a hydrocarboxylic acid, or a nonionic surfactant, and the acidic component is a protic acid such as nitric acid. The salt must be capable of (1) existing as colloidal salt particulates, (2) existing in ion species or (3) forming ions when dispersed in a composition containing a latex polymer. In the formation of a sol or gel, the salt containing cations or cations capable of being dispersed in the admixture of solvent and stabilizer. In one embodiment for preparing the sol or gel containing a solvent, stabilizer, salt and acidic component, the ingredients are admixed at room temperature and slowly heated to a temperature in the range from about 35° C. to about 85° C. for a period sufficient to produce a transparent product, ordinarily from about 0.5 to about 15 hours, and having the color of the characteristic anion or cation of the particular salt in the admixture. The transparent product is a sol or gel composition containing the cations and anions and/or colloidal salt particulates of the particular salt of the admixture. At least one cation and/or at least one anion of the salt is dispersed in the dried resultant latex polymer/salt composition. Although the invention is not bound by any theory, it is believed that at least some of the particulates derived from the starting salt exists as colloidal salt particulates dispersed in the resultant latex polymer/salt composition. Although all polymers are contemplated in the present invention, a suitable polymer is a nonconjugated polymer such as a latex polymer disclosed in the aforementioned application Ser. No. 305,451, now U.S. Pat. No. 5,004,562. Polymer concentrations in compositions containing a starting latex polymer, particularly those with dispersions in aqueous media, are ordinarily greater than about 0.1 weight percent of the composition. Usually the concentrations are greater than 1 weight percent and preferably greater than 5 weight percent, but most commonly in the range from about 40 to 70 percent for those latexes resulting from emulsion polymerization. An intermediate mixture of salt, stabilizer and solvent is heated to prepare a sol or gel which is typically mixed with a starting latex polymer to produce a product admixture containing the salt and latex polymer.

A starting textile material useful in the present invention includes assemblies of natural or synthetic fibers, filaments, yarns, and the like, as for example, wovens, nonwovens, knitted textiles, threads, ropes, yarns, etc., which are employed, in one form or another, either alone or as components of composite articles. As used herein, reference to fibers includes filaments and yarns. The fibers may be obtained from animals (for example, wool, hair, silk, fur and the like), from vegetable matter (as for example, cotton, flax, hemp, straw and the like), from minerals or metals (for example, asbestos, aluminum, gold, etc.), or from commercial synthesis (for example, polymers such as rayon, nylon, polyester acrylics, polyurethanes, glass fiber, etc.), either wholly crystalline like asbestos and metal wires, wholly amorphous like glass, or in the case of the preferred group of fibers, e.g., polymer compositions, partly crystalline and partly amorphous. Examples of textile materials treated in accordance with the present invention include nonwovens such as hospital sheets, gowns, masks, diapers, roofing materials, napkins, tile backings (for ungrouted tile prior to installation), drapery materials, clothing materials (including apparel interlinings and interfacings), carpet materials, consumer and industrial wipes, towels, carpet and rug backings, components of automobile tops, roadbed underlayments, insulation, siding, interior wall and ceiling finishes, quilts, mattress pads, mattress covers, sleeping bags, furniture underlayments (padding), air filters, carpet underlayments (e.g., carpet pads), padding and packaging for stored and shipped materials; floor care pads, crib kick pads, house robes, furniture and toss pillows, kitchen and industrial scrub pads, and others too numerous to mention.

Such starting textile materials provide the fiber substrate which is suffused by the herein described sol or gel composition or product admixture composition containing a sol or gel and a polymer. Throughout this specification and the appended claims, the word "suffuse" is used to describe the mechanism by which the components of the sol or gel composition or components of the admixture product composition are contacted and held to the fibers of the textile material. The invention embraces whatever mechanism, including adsorption, absorption, diffusion, deposition, chemical reaction, etc., or some combination of such mechanisms, by which the components of the sol or gel composition or admixture product composition are retained by the fibers of the textile material. The contacting methods include, but are not limited to, total incorporation, including solution, emulsification, dispersion and chemical reaction; surface incorporation, including coating, deposition and impregnation; and combinations thereof. After contact of the textile material with the sol or gel composition or the product admixture composition (sol or gel and polymer), water is usually removed from the treated composition by any drying method which is ordinarily employed for drying the particular textile material.

The product admixture compositions (polymer/sol or gel) may be mixed with a filler to produce a compounded polymer/salt product composition which may be combined with a starting textile material to produce a textile composition containing a latex polymer, a salt (in a salt-containing sol or gel) and a filler material. Such compositions are typically applied to carpet backing surfaces. Alternatively, either the front or back surface of a textile material may be contacted with the sol or gel composition described herein to produce a textile composition containing components of the sol or gel. In either embodiment, the filler material is optional; e.g., the filler is employed to replace at least a portion of the sol or gel composition or product admixture composition primarily to reduce the expense of the preparation method and finished product. In a method for preparing a compounded polymer/salt product composition, particularly useful for suffusing a carpet backing surface, the sol or gel composition described herein or the product admixture composition containing the sol or gel components and the polymer described herein, are mixed with a filler material, and optionally one or more emulsified compatible plasticizers, and further optionally a frothing agent.

The amount of salt contained in the sol or gel composition is dependent upon the amount of salt needed to be added to a starting textile material to provide an electrical conductively to a textile composition that is greater than the electrical conductivity of the textile composition without the added salt. Ordinarily the textile composition of the invention contains sufficient salt suffused therein to provide at least 5 percent, preferably at least 10 percent, and most preferably at least 25 percent greater electrical conductivity than the textile composition without the added salt. The textile composition of the invention ordinarily contains added salt in an amount greater than 0.1 weight percent, usually greater than 0.3 weight percent and preferably greater than 0.5 weight percent.

Although the amount of salt contained in the product admixture composition of sol or gel and polymer is dependent upon the particular composition of polymer and the particular salt comprising the product admixture, ordinarily the salt contained in the sol or gel composition which is added to the composition containing the polymer comprises sufficient additional salt to provide an antistatic property to the treated textile composition of the invention. The term "added salt" or "additional salt", as used herein, refers to any amount of salt added to the composition containing a polymer or to the starting textile material which converts such compositions or materials (1) from having no antistatic property to having antistatic property (2) or from having low antistatic property to having increased antistatic property. Particularly, when compositions containing latex polymers are involved, the weight percent of sufficient added salt in the product admixture composition is usually greater than 0.05, preferably greater than 0.1, and most preferably greater than 0.5. Such product admixture compositions when applied to starting textile materials provide effective antistatic properties to the textile composition of the invention, i.e., the textile composition usually has an electrical conductivity greater than $10^{-10}$ Seimens/cm, preferably in the range from about $10^{-8}$ Seimens/cm to about 10 Seimens/cm, and most preferably from about 0.1 Seimens/cm to about 10 Seimens/cm.

Suitable compatible plasticizers, if utilized, depend upon the polymer combined with the sol or gel composition, and in an amount required to obtain a desired flexibility, lowered glass transition temperature (Tg) or softness.

Fillers, particularly inorganic fillers, are added to the sol or gel composition or, in the alternative, to the product admixture containing the components of the sol or gel and a polymer, in an amount of at least about 50 parts by weight per hundred parts by weight (dry) of the polymer. Usually the filler is added in an amount from about 100 to about 500, preferably from about 200 to about 400, parts by weight per hundred parts by weight (dry) of the polymer. Examples of useful fillers are calcium carbonate (particularly from a source such as limestone), barytes, diatomaceous earth, aluminum trihydrates, hydrated aluminum silicates (clays), particularly from a source such as mica or talc, and the like and mixtures thereof. Calcium carbonate is highly preferred.

An unusual feature of the invention is the compatibility of the product admixture composition (containing a sol or gel composition and a polymer, preferably a latex polymer) with a filler material. The filler material has a pH greater than about 4.0, preferably greater than about 7.0 and typically in the range from about 8.0 to about 11.0. Although the sol or gel composition or the product admixture compositions containing the sol or gel admixture with the polymer are acidic and have a pH less than 7.0 and typically less than 4.0, the compounded polymer/salt product composition obtained from mixing the sol or gel or product admixture compositions with the filler material itself is stable and non-coagulated, having well dispersed components (such as salt) therein, i.e. no coagulation or precipitation of the admixed component is observed. The compounded polymer/salt product composition containing the filler material usually has a pH in the range from about 7.0 to about 9.0 and is capable of being readily suffused with a starting textile material to produce the textile composition of the invention.

Also, a frothing agent may be used in a minor amount by weight (dry) sufficient to froth a polymer composition, i.e., the product admixture composition comprising a latex polymer and sol or gel containing a salt. The frothing agent is usually used to form a froth or foam of the composition containing the latex polymer, filler and optionally the emulsified plasticizer. Frothing agents well known in the art may be utilized in the invention. A suitable frothing agent comprises urea, the sodium salt of condensed naphthalene, sulfonic acid, mixed $C_8$–$C_{18}$ fatty alcohols, ammonium or sodium lauryl sulfate and water. The frothing of a polymer-containing (i.e., latex) mixture or composition can be conducted in an Oakes, Firestone or other type foamer using air or an inert gas such as nitrogen to the desired froth density. Also, mixtures of frothing agents can be used.

Other compounding ingredients may be added to the product admixture composition such as thickeners, pigment colors, coalescence aids, additional surfactants, defoamers for use during blending and the like.

The sols or gels described herein can be applied to the back or front of any textile material, particularly to aid in securing base yarns of the textile and may also be applied to a secondary backing. Preferably, the sols or gels, product admixtures or compounded polymer/salt product compositions may be applied to piled or tufted carpet material. A compounded polymer/salt product composition can be applied to a textile material, preferably a carpet, by means typical for the particular textile material and then dried (such as air or oven dried) to produce a dried compounded polymer/salt product composition which provides the textile material with antistatic properties. Such a dried compounded polymer/salt product composition contains a greater amount, preferably at least 10 percent greater, and most preferably at least 25 percent greater amount of salt than is contained in a composition not prepared by introducing the salt into the composition by addition of a salt-containing sol or gel composition.

The textile composition of the invention, containing a textile material suffused with at least one salt, ordinarily has an electrical conductivity greater than $10^{-10}$ Seimens/cm, and usually greater than $10^{-8}$ Seimens/cm. Favorable antistatic properties are imparted to the textile composition of the invention when the electrical conductivity of the textile composition is in the range from about $10^{-8}$ Seimens/cm to about 10 Seimens/cm, and preferably from about 0.1 to about 10 Seimens/cm.

The invention is further illustrated by the following examples which are illustrative of specific modes of practicing the invention and are not intended as limiting the scope of the invention defined by the appended claims.

EXAMPLE 1

A sol containing neodymium nitrate is prepared as follows: to a 1 liter container is added 492 grams of ethylene glycol solvent, 332 grams of 9 mol EO nonylphenol surfactant stabilizer (i.e., a nonionic surfactant which is a polyethoxylated nonylphenol surfactant having 9 moles of ethylene oxide per mole) and 100 grams of neodymium nitrate (pentahydrate). From room temperature (about 25° C.), the mixture is slowly heated to 40° C. and held at 40° C. for 4 hours A clear, transparent product sol is formed having a violet color. The transparent violet colored sol contains neodymium cations ($Nd^{3+}$), nitrate anions and colloidal size neodymium nitrate salt particles dispersed in the liquid medium. Such a product is then cooled to room temperature. The transparent product is a stable sol having a pH of 2.73 and a viscosity of 180 cps.

EXAMPLE 2

A neodymium nitrate salt is admixed with a commercially available latex polymer composition (designated as "76 RES 4400" available from Union Chemicals Division of Union Oil Company of California, dba Unocal, i.e., "UCD") containing a styrene butadiene rubber (SBR) to produce a noncoagulated product admixture composition containing the stable, latex polymer together with the neodymium nitrate salt uniformly dispersed in the product admixture. The neodymium nitrate salt is added to the composition containing the latex polymer by addition of the sol prepared in Example 1 containing the neodymium nitrate salt.

One part by weight (30 grams) of the neodymium nitrate containing sol is admixed with 9 parts by weight (270 grams) of the composition containing the latex polymer to produce a stable, noncoagulated product admixture composition containing neodymium nitrate salt, including neodymium ($Nd^{3+}$) cations, uniformly dispersed in the latex polymer. The stable product admixture indicates the sol and latex polymer are compatible, with the resultant latex polymer product admixture being not coagulated. No coagulation of the latex polymer composition is observed for at least four months following admixing.

The resultant latex polymer product admixture is then compounded with a filler material containing calcium carbonate ($CaCO_3$) to produce a compounded latex/salt product. The compounding is done by blending 31 grams of the resultant latex polymer/salt product admixture with 67 grams Franklin limestone filler material, 0.16 grams sodium vinyl sulfonate frothing agent, and 2.1 grams water. The blend is then thickened to 6000 cps. by the addition of 35 grams of a polyacrylic acid/polyacrylamide product thickener (i.e., Jarco 1111). Thirty grams of this compounded latex/salt product is poured into a 3 inch Petri dish and air dried.

EXAMPLE 3

Several sols prepared according to the procedure in Example 1 are compatibly combined with 76 RES 4400 in the same manner as in Example 2. Each product admixture is prepared in a 3.5 inch Petri dish and air dried at room temperature for 1 week. The dried resultant latex polymer/salt films containing the various salts (and/or cations and/or anions) have the electrical conductivity properties summarized in Table A. The Biddle Model No. 22005 Electric Testing Equipment is used to test the dried resultant latex polymer/salt films. The Biddle Testing Equipment contains brass strips which are placed one inch apart and voltage is applied while determining current flow. The observed alternating electrical current flow (microamperes) at the indicated applied voltage (kilovolts, KV) as summarized in Table A for several compounded dried resultant latex polymer/salt films is as follows:

TABLE A

| Current Flow as a Function of Applied Voltage for Several Compounded Sol-Latexes | | | | | | |
|---|---|---|---|---|---|---|
| | Observed Current (microamps) at Applied Voltage (KV) | | | | | |
| Sol Used | 0.1 KV | 0.5 KV | 1 KV | 1.8 KV | 2.5 KV | 5 KV |
| None | 0 | 0 | 0 | 0 | 0 | <1 |
| $NH_4NO_3$ | 100 | 490 | 1100 | 3600 | 5000 | — |
| $Al(OAc)_3$ | 60 | 330 | 1100 | 3100 | 3600 | 4000 |
| $Ca(OAc)_2$ | 20 | 110 | 780 | 2400 | 2800 | 3100 |
| $Cu(OAc)_2$ | 35 | 120 | 850 | 2600 | 2900 | 3600 |
| $Dy(NO_3)_3$ | 125 | 700 | 1700 | 4200 | 5000 | — |
| LiOAc | 6 | 65 | 510 | 1800 | 2100 | 2400 |
| $Mg(OAc)_2$ | 20 | 115 | 770 | 2400 | 2700 | 3000 |
| $Nd(NO_3)_3$ | 80 | 510 | 1420 | 3500 | 5000 | — |
| NaOAc | 5 | 70 | 530 | 1900 | 2100 | 2500 |
| $Y(OAc)_3$ | 90 | 390 | 1250 | 3800 | 5000 | — |
| $Zn(OAc)_2$ | 20 | 110 | 760 | 2400 | 2800 | 3200 |

EXAMPLE 4

In a procedure similar to that in Example 2 a 1-liter reactor is charged with 246 grams ethylene glycol, 166 grams citric acid (monohydrate), 50 grams neodymium nitrate (pentahydrate), and 21 grams nitric acid. The mixture is heated at 40° C. for 6 hours. The transparent product when cooled to room temperature has a pH of 0.1 and a Brookfield viscosity of 193 cps.

Dyspropsium nitrate and ammonium nitrate are used to prepare citric acid sols in the same manner. The dysprosium sol has a pH of <0.1 and a Brookfield viscosity of 326 cps. The ammonium sol has a pH of 0.1 and a Brookfield viscosity of 396 cps.

EXAMPLE 5

Sols from Example 4 using citric acid as a stabilizer of the sol are compatibly admixed with 76 RES 4400 SBR latex and dried in the same manner as in Example 2. The resultant latex polymer/salt compositions are tested as in Example 3 and the observed current flow data summarized in Table B.

TABLE B

Current Flow as a Function of Applied Voltage for Citric Acid Compounded Sol-Latexes

| Sol Used | Observed Current (microamps) at Applied Voltage (KV) | | | | |
|---|---|---|---|---|---|
| | 0.1 KV | 0.5 KV | 1 KV | 2.5 KV | 5 KV |
| $NH_4NO_3$ | 29 | 70 | 350 | 5000 | — |
| $Dy(NO_3)_3$ | 10 | 40 | 80 | 330 | 1800 |
| $Nd(NO_3)_3$ | 22 | 65 | 320 | 5000 | — |

EXAMPLE 6

Using the method of Examples 2 and 3, the weight percent of neodymium nitrate/nonionic sol of Example 1 is varied in the 76 RES 4400 SBR latex of Example 2 and evaluated by the Biddle testing method of Example 3.

TABLE C

Current Flow as a Function of Applied Voltage for Variations of Neodymium Nitrate/Nonionic Sol in Resulting Latex Polymer Product Admixtures

| Sol No. | Amt. Sol in Latex, wt. % | Observed Current (microamps) at Applied Voltage (KV) | | | | |
|---|---|---|---|---|---|---|
| | | 0.1 KV | 0.5 KV | 1 KV | 2.5 KV | 5 KV |
| 1 | 5 | 0.4 | 0.7 | 1 | 2.7 | 7.6 |
| 2 | 10 | 80 | 510 | 1420 | 5000 | — |
| 3 | 12.5 | 450 | 2100 | 5000 | — | — |
| 4 | 15 | 5000 | — | — | — | — |

EXAMPLE 7

A compounded latex/salt product composition obtained from a 15% neodymium nitrate/nonionic sol admixed with 76 RES SBR latex of Example 2 (Sol No. 4 in Table C of Example 6) which is compounded with limestone ($CaCO_3$), sodium lauryl sulfonate and water in the manner of Example 2 is placed on the backing of a square yard of continuous fiber carpet. The amount of compounded latex/salt product composition used is 80 grams, which is applied to the carpet backing using a #40 drawdown rod.

The textile composition (i.e., dried carpet) is evaluated using the Biddle testing equipment in a similar manner as in Example 3. Measurements are made in three directions: (1) the cross direction, (2) the machine direction, and (3) on a diagonal line using a 36 inch spacing between the brass electrodes. The values for 5 KV applied voltage are: cross, 3100 microamps; machine, 500 microamps; diagonal, 3200 microamps.

A sample of carpet treated similarly but without the neodymium sol component shows the following current flows at 5 KV applied voltage: cross, 4 microamps; machine, 11 microamps; diagonal, 4 microamps.

In view of the foregoing description of the invention including the examples thereof, it is evident that many alternatives, modifications, and variations can be made by those skilled in the art without departing from the concept of the present invention. Accordingly, it is intended in the invention to embrace all such alternatives, modifications, and variations as may fall within the scope of the appended claims.

I claim:

1. A dried compounded polymer/salt product composition comprising colloidal salt particulates and a polymer derived from a latex suffused in a textile material and prepared by the method comprising the step of contacting a textile material with a product admixture composition comprising (1) a sol or gel composition containing (a) a salt in the form of anions, cations and colloidal salt particulates and (b) a nonaqueous solvent admixed with (2) a latex of a polymer.

2. A dry compounded polymer/salt product composition providing a textile material with an antistatic property, said composition comprising colloidal salt particulates, at least one polymer derived from a latex and a filler material.

3. A dry compounded polymer/salt product composition providing a textile material with an antistatic property, said product composition comprising a non-conjugated polymer and at least about 0.03 weight percent of added salt in the form of colloidal salt particulates wherein said polymer is derived from a latex.

4. The dried composition defined in claim 1 wherein said sol or gel composition further comprises a stabilizer comprising a chelator or a nonionic surfactant.

5. The dried composition defined in claim 4 wherein said product admixture composition further comprises a filler material.

6. The dried composition defined in claim 5 wherein said product admixture composition has a pH less than 4.0 and said filler material has a pH greater than 4.0.

7. The dried composition defined in claim 5 wherein said product admixture composition further comprises a plasticizer.

8. The dried composition defined in claim 5 wherein said product admixture composition further comprises a frothing agent.

9. The dried composition defined in claim 4 having an electrical conductivity in the range from about $10^{-8}$ to about 10 Seimens/cm.

10. The dried composition defined in claim 4 having an electrical conductivity in the range from about 0.1 to about 10 Seimens/cm.

11. The composition defined in claim 1 comprising at least about 0.03 weight percent of said salt.

12. The composition defined in claim 1 having an electrical conductivity greater than $10^{-10}$ Seimens/cm.

13. The dried composition defined in claim 1 wherein said salt comprises at least one metal cation selected from the group consisting of neodymium, aluminum, calcium, copper, dysprosium, lithium, magnesium, sodium, yttrium, ytterbium and zinc, or at least one nonmetallic cation selected from the group consisting of ammonium, boron and silicon.

14. The product composition defined in claim 2 wherein said filler is selected from the group consisting of calcium carbonate, barytes, diatomaceous earth, aluminum trihydrate and aluminum silicate.

15. The product composition defined in claim 2 wherein a textile material suffused with said product composition has an electrical conductivity greater than $10^{-8}$ Seimens/cm.

16. The product composition defined in claim 2 wherein said colloidal salt particulates comprise at least one metal cation selected from the group consisting of neodymium, aluminum, calcium, copper, dysprosium, lithium, magnesium, sodium, yttrium, ytterbium and zinc, or at least one nonmetallic cation selected from the group consisting of ammonium, boron and silicon.

17. The product composition defined in claim 2 wherein said polymer is nonconjugated.

18. The product composition defined in claim 3 wherein said nonconjugated polymer derived from a latex and having an electrical conductivity greater than $10^{-8}$ Seimens/cm.

19. The product composition defined in claim 18 further comprising a filler material.

* * * * *